United States Patent [19]

Bhattacharya et al.

[11] Patent Number: 5,465,203

[45] Date of Patent: Nov. 7, 1995

[54] HYBRID SERIES ACTIVE/PARALLEL PASSIVE POWER LINE CONDITIONER WITH CONTROLLED HARMONIC INJECTION

[75] Inventors: Subhashish Bhattacharya; Deepakraj M. Divan, both of Madison, Wis.

[73] Assignee: Electric Power Research Institute, Inc., Palo Alto, Calif.

[21] Appl. No.: 79,303

[22] Filed: Jun. 18, 1993

[51] Int. Cl.⁶ .................................... H02M 1/12
[52] U.S. Cl. ................... 363/40; 323/207; 323/208; 307/105
[58] Field of Search ........................ 323/214, 215, 323/233, 259, 343, 263, 207; 363/40, 41

[56] References Cited

U.S. PATENT DOCUMENTS

| | | | |
|---|---|---|---|
| 3,849,677 | 11/1974 | Stacey et al. | 307/295 |
| 4,063,144 | 12/1977 | Hucker et al. | 363/43 |
| 4,651,265 | 3/1987 | Stacey et al. | 363/35 |
| 4,800,326 | 1/1989 | Unsworth | 318/729 |
| 4,811,236 | 3/1989 | Brennen et al. | 323/210 |
| 4,812,669 | 3/1989 | Takeda et al. | 307/105 |
| 4,814,683 | 3/1989 | Okamoto et al. | 318/800 |
| 4,823,251 | 4/1989 | Kawabata et al. | 363/95 |
| 4,937,720 | 6/1990 | Kirchberg | 363/41 |
| 4,962,976 | 10/1990 | Takahashi et al. | 318/81 |
| 5,001,619 | 3/1991 | Nakajima et al. | 363/41 |
| 5,016,157 | 5/1991 | Rozman et al. | 363/39 |
| 5,038,092 | 8/1991 | Asano et al. | 318/811 |
| 5,047,909 | 9/1991 | Hosoda | 363/40 |
| 5,187,427 | 2/1993 | Erdman | 323/207 |
| 5,321,598 | 6/1994 | Moran | 363/41 |

OTHER PUBLICATIONS

Kawabata, "Parallel Processing Inverter System", IEEE Transactions on Power Electronics, vol. 6, No. 3, Jul. 1991, pp. 442–450.

Peng, F. Z. et al.; "A New Approach to Harmonic Compensation in Power Systems", IEEE/IAS Annual Meeting, pp. 874–880, 1988.

Banerjee, B. Ben et al.; "Design of an Active Series/Passive Parallel Harmonic Filter for ASD Loads at a Wastewater Treatment Plant", Proc. of the 2nd International Power Quality Applications Conference, PQA, '92, Atlanta 1992, pp. 1–7.

Primary Examiner—Thomas M. Dougherty
Assistant Examiner—Shawn Riley
Attorney, Agent, or Firm—Flehr, Hohbach, Test, Albritton & Herbert

[57] ABSTRACT

A power line conditioner includes an active filter coupled, in series, and a passive filter coupled, in parallel, to a three-phase power distribution network. The three-phase power distribution network includes a voltage source that induces three-phase input currents at a first end of the three-phase power distribution network. A load, circulating three-phase load currents, is positioned at a second end of the three-phase power distribution network. The active filter controller of the invention uses synchronous transformations to identify selected harmonic reference components corresponding to individual harmonics of the three-phase load currents. The selected harmonic reference components are multiplied by a predetermined factor corresponding to a permissible percentage of the individual harmonics that may be injected into the supply voltage. This results in active filter reference signal components that are applied to the active filter. In response to the active filter reference signal components, the active filter injects a permissible percentage of harmonics into the supply voltage so as to reduce the voltage distortion at the passive filter. By reducing voltage distortion, the controlled injection of harmonics into the supply allows for a simplified passive filter design. Consequently, the passive filter may be implemented as a power factor correction capacitor.

21 Claims, 11 Drawing Sheets

$$F_q = F_a$$
$$F_d = \frac{-1}{\sqrt{3}} F_a - \frac{2}{\sqrt{3}} F_b$$

$$\begin{vmatrix} F_q \\ F_d \end{vmatrix} = \begin{vmatrix} \cos\theta & -\sin\theta \\ \sin\theta & \cos\theta \end{vmatrix} \begin{vmatrix} F_q^s \\ F_d^s \end{vmatrix}$$

VECTOR ROTATION EQUATIONS $$\hat{F}_{qd} = \varepsilon^{-j\theta} \hat{F}^s_{qd}$$

WHERE $\hat{F}_{qd} = F_q - jF_d$ $\hat{F}^s_{qd} = F^s_q - jF^s_d$ $$\begin{vmatrix} F_q{}^s \\ F_d{}^s \end{vmatrix} = \begin{vmatrix} \cos\theta & \sin\theta \\ -\sin\theta & \cos\theta \end{vmatrix} \begin{vmatrix} F_q \\ F_d \end{vmatrix}$$

$F_a = F_q$ $F_b = \frac{-1}{2} F_q - \frac{\sqrt{3}}{2} F_d$ $F_c = -F_a - F_b$

VECTOR ROTATION $\hat{F}^s{}_{qd} = \varepsilon^{j\theta} \hat{F}_{qd}$

WHERE $\hat{F}_{qd} = F_q - jF_d$ $\hat{F}^s{}_{qd} = F^s{}_q - jF^s{}_d$

HYBRID SERIES ACTIVE/PARALLEL PASSIVE POWER LINE CONDITIONER WITH CONTROLLED HARMONIC INJECTION

BRIEF DESCRIPTION OF THE INVENTION

This invention relates generally to a power conditioning apparatus and method which produces low distortion terminal voltage and supply current harmonics. This invention more particularly relates to a hybrid series active and parallel passive filter system which injects a controlled amount of load harmonic current signals, in compliance with relevant standards, into a power supply to reduce terminal voltage total harmonic distortion.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency several times higher than the fundamental.

Inverter switching action generates transients and spurious frequencies in a power signal, usually in the form of harmonics of the switching frequency. The switching action may also produce electromagnetic interference (EMI) which is radiated or conducted through the supply line. While the internal design of an inverter is chosen to minimize transients and spurious frequencies, it is usually necessary to filter the input or the output of the inverter.

A growing number of nonlinear loads in the electric utility power network has resulted in increasing waveform distortion of both voltages and currents in ac power distribution systems. Typical nonlinear loads are computer controlled data processing equipment, numerical controlled machines, variable speed motor drives, robotics, medical and communication equipment.

Nonlinear loads draw square wave or pulse-like currents instead of purely sinusoidal currents drawn by conventional linear loads. As a result, nonlinear current flows through the predominantly inductive source impedance of the electric supply network. Consequently, a non-linear load causes load current harmonics and reactive power to flow back into the power source. This results in unacceptable voltage harmonics and supply load interaction in the electric power distribution in spite of the existence of voltage regulators.

The degree of current or voltage distortion can be expressed in terms of the relative magnitudes of harmonics in the waveforms. Total Harmonic Distortion (THD) is one of the accepted standards for measuring voltage or current quality in the electric power industry.

Apart from voltage and current distortion, another related problem may arise when nonlinear loads are connected to the electric power network. In particular, when the load current contains large amounts of third or other triplen harmonics, the harmonic current tends to flow in the neutral conductor of the power system. Under these conditions, the neutral current can exceed the rated current of the neutral conductor. Since the neutral is normally designed to carry only a fraction of the line current, overheating or even electric fires can result.

The generation of harmonic waveforms, fundamental frequency reactive currents, loads that cause sags and surges in the supply voltage, and unbalanced three phase currents has resulted in the emergence of standards such as IEC 555 and IEEE 519 which force greater attention on the converter-utility interface. The maximum allowable voltage THD and the individual harmonic voltages are specified by IEEE 519 harmonic standards for different voltage levels. By way of example, under the IEEE 519 standard, a 460V coupling must operate within the following harmonic injection parameters: 5th and 7th harmonics—7%, 11th and 13th harmonics—3.5%, 17th and 19th harmonics—2.5%, 23 and 25 harmonics—1%. Thus, for the 11th and 13th harmonics, no greater than a 3.5% THD may be injected back into the supply. Several utilities are now requiring that their industrial customers conform to the IEEE 519 standard.

A number of techniques have been utilized to reach these low THD values. Passive filters, such as LC tuned filters, are often used because they are efficient and inexpensive. On the other hand, there are a number of problems associated with passive filters. First, the source impedance strongly influences the compensation characteristics of the passive filter. Next, the passive filter may cause a parallel resonance with the ac supply, thereby causing amplification of the harmonic currents on the source side at specified frequencies. The passive filter may also cause a series resonance with the source, thereby causing significant voltage harmonics on the ac source. Another problem is that it is difficult to ensure that the background distortion on the utility supply does not overload the filter. Passive filters also tend to be susceptible to load and line switching transients. Finally, passive filters are sensitive to ac system impedances that change as a result of system configurations such as line switching; they are also sensitive to component tolerances. Since passive filters are designed for a specific load, they cannot be tuned to 5th, 7th, and other dominant harmonics of the load because they might be overloaded with supply side harmonics at the tuned frequencies. Hence, they have to be inherently off-tuned (for example, at 4.7 instead of 5). In such a case, the passive tuned filters are unable to absorb the dominant load harmonics. As a result, the dominant load harmonics will flow into the supply.

Active power filters have been used to resolve some of the problems associated with passive filters. Active power filters, or active power line conditioners (APLCs), inject signals into an ac system to cancel harmonics. Specifically, the injected signal has the same amplitude and reverse phase of the load current harmonics to be eliminated.

Active filters comprise one or two pulse width modulated inverters in a series, parallel, or series-parallel configuration. The inverters have a dc link, which can be a dc inductor (current link) or a dc capacitor (voltage link). It is advantageous to keep the energy stored in the dc link (capacitor voltage or inductor current) at an essentially constant value. The voltage on the dc link capacitor can be regulated by injecting a small amount of real current into the dc link. The injected current covers the switching and conduction losses inside the APLC. The link voltage control can be performed by the parallel inverter.

There are a number of problems associated with active filters. First, it is difficult to realize an active filter with large VA rating, rapid current response and low losses. Next, the initial and running costs are high compared to passive filters. Finally, the harmonic currents injected from the active filter may flow into other passive filters and capacitors connected on the ac system.

The use of hybrid passive-active filters has been proposed as a means for combining the lower cost of passive filters with the control capability offered by a small rating series active filter. In such a system, the passive filter absorbs all harmonic currents generated by the load, while the small series active filter provides harmonic isolation between the load and the power source (utility company). The series active filter is controlled to force all load harmonics into the passive filter, thereby achieving harmonic isolation between the load and the supply. This forces purely sinusoidal current in the ac line. All harmonic currents, are in principle, diverted to the passive filter which provides a low impedance path for the dominant harmonics.

A combined system with a shunt passive filter and a small rated series active filter is illustrated in FIG. 1. The system 20 includes a shunt passive LC filter 22 with a 5th tuned LC filter 24, a 7th tuned LC filter 26, and a high pass filter 28 connected in parallel with the load 30. A small rated series active filter may be realized with a three-phase inverter 34, such as a resonant dc link voltage source inverter. The inverter 34 uses six Insulated Gate Bipolar Transistors 36 with six feedback diodes 38. Naturally, other switching devices with intrinsic turn-off capabilities may be used. A dc capacitor 40 is used as a dc link voltage source. Transformers 42 are used to realize a serial coupling to the three-phase power lines 44A, 44B, and 44C which are energized by power supply 46.

Assuming that the series active filter realized by the voltage source inverter has large bandwidth and therefore behaves as an ideal controllable voltage source, a single phase equivalent circuit for the system of FIG. 1 is shown in FIG. 2(a). In FIG. 2(a), $Z_f$ is the impedance of the shunt passive filter system 22 and $Z_s$ is the source impedance. The harmonic producing load 30 acts like a current source. The control strategy is to modulate the series active filter 34 so as to ideally present a zero impedance at the fundamental frequency and infinite pure resistance at all the load current harmonic frequencies. In such a case, the load current harmonics are constrained to flow in the shunt passive filter, and the worst case harmonic voltage across the series active filter 34 is given by the arithmetic sum of the supply voltage harmonics, if present, and the shunt passive filter terminal voltage harmonics. The series active filter 34 is controlled to act as an active impedance, which differs from the conventional series or shunt active filters that are respectively controlled to act as a voltage source (zero impedance) or current source (infinite impedance).

FIGS. 2(b) and 2(c) show the equivalent circuit of FIG. 2(a) for the fundamental and the harmonics respectively, assuming zero impedance at the fundamental and a finite maximum resistance K (ohms) at all the harmonic frequencies of the load. It can be seen from FIG. 2(b) that no fundamental frequency voltage is applied to the inverter, and the shunt passive filter only acts as a power factor improvement capacitor of the load for the fundamental.

From FIG. 2(c), one may derive the following equations:

$$I_{sh} = \frac{Z_f * I_{LH}}{Z_s + Z_f + K} + \frac{V_{sh}}{Z_s + Z_f + K} \quad (1)$$

$$V_{fh} = Z_f I_{fh} = -\frac{(Z_s + K) Z_f I_{Lh}}{Z_s + Z_f + K} + \frac{Z_f V_{sh}}{Z_s + Z_f + K} \quad (2)$$

$$V_c = V_{ch} = \frac{K Z_f I_{Lh}}{Z_s + Z_f + K} + \frac{K V_{sh}}{Z_s + Z_f + K} \quad (3)$$

Equations 1–3 indicate that if the series active filter 34 can be controlled such that $K \gg Z_f$, then the load current harmonics are constrained to flow into the shunt passive filter, instead of flowing back into the source. From FIG. 2(c), it can be seen that if the series active filter can be controlled such that the resistance K is much larger than the source impedance, $Z_s$, then the source impedance will have no effect on the compensation characteristics of the shunt passive filter 22. Also, no ambient harmonics generated elsewhere in the system can flow into the shunt passive filter and hence the possibility of resonance condition between the source 46 and the shunt passive filter 22 is eliminated. Similarly, since no load current harmonics can flow into the source 46 or to other passive filters elsewhere in the system, the possibility of resonance condition between the load 30 and the source 46 (beyond the point of common coupling) is also eliminated. The series active filter 34 acts like a damping resistance to harmonics, which solves the problems associated with using only a shunt passive filter, such as anti-resonance and harmonic sinks to the power system. The series active filter 34 acts as a current controlled voltage harmonic source and does not inject any fundamental voltage. Hence, it does not effect the fundamental supply current which is dictated by the load and the passive filter system.

The equations also indicate that if the series active filter 34 can be controlled such that $K \gg Z_f$ and $K \gg F_v$, then the harmonic voltages of the source $V_{sh}$, applies only to the series active filter 34 and not to the shunt passive filter 22 terminal voltage Vf. In this case, harmonic voltages applied to the series active filter 34 are given by the vector sum of harmonic voltages generated by the load current harmonics flowing into the shunt passive filter, $Z_f I_{Lh}$, and the harmonic voltages of the source $V_{sh}$. This is characterized by the following equation:

$$V_{ch} = -Z_f I_{Lh} + V_{sh} \quad (4)$$

The first term on the right hand side of equation (4) relates to the harmonic impedance of the shunt passive filter and depends on the quality factor Q, of the shunt passive filter. The larger the value of Q, the smaller is the required VA rating of the series active filter. The second term on the right hand side of the equation depends on the harmonic voltage of the supply, $V_{sh}$, which does not appear at the shunt passive filter terminal but is applied across the series active filter. In such a case the series active filter isolates the load current harmonics from the power system and the power system's harmonics from the load, and the series active filter acts as a "harmonic isolator". Due to the "harmonic isolator" action of the series active filter 34, the shunt passive filter 22 can be designed independent of the source impedance.

If the series active filter can achieve a value of K sufficiently larger than the source impedance, $Z_s$, and the shunt passive filter impedance, $Z_f$, for all load current harmonics, then the series active filter can achieve good harmonic isolation between the source and the load. The features and performance of the combined system of series active filter 34 and shunt passive filter 22 are greatly influenced by the filtering algorithm employed for the extraction of source current harmonics and the control scheme for the series active filter 34.

A synchronous reference frame regulator may be used to implement the described control strategy for the series active filter 34. The operation of the series active filter 34 is governed by a pulse-width modulator or a discrete pulse modulator which toggles the gates of the IGBTs 36 (or other active devices used in the filter) in a predetermined fashion.

Synchronous reference frame regulators have been widely used for controlling ac machines. In general, ac machine control theory is directed toward providing accurate mechanisms for controlling the torque of a machine. Torque control in an ac machine is obtained by managing a current vector composing amplitude and phase terms. The control of ac machines is complicated by the requirement of external control of the field flux and armature mmf spatial orientation. In the absence of such a control mechanism, the space angles between the various fields in an ac machine vary with load and result in oscillations or other unfavorable physical phenomenon. Control systems for ac machines which directly control the field flux and armature mmf spatial orientation are commonly referred to as "field orientation" or "angle" controllers. Such controllers employ synchronous transformations, as will be described below.

The fundamental principles of field orientation control of ac motors is described in Introduction to Field Orientation and High Performance AC Drives, IEEE Industrial Drives Committee of the IEEE Industry Applications Society, Oct. 6–7, 1986. Field orientation principles rely upon the fact that the rotor of a motor has two axes of magnetic symmetry. One axis is known as the direct axis, and the other axis is known as the quadrature axis. These terms are usually shortened to simply refer to the d-axis and the q-axis.

Field orientation techniques endeavor to control the phase of the stator current to maintain the same orientation of the stator mmf vector relative to the field winding in the d-axis within the d-q scheme. FIG. 3 depicts a symbolic representation of a field orientation control system and its corresponding mathematical model. The three phase system (a, b, c) is first synchronously transformed to a two phase ds-qs scheme which is stationary with respect to the three phase system. This 3-phase to 2-phase transformation is equivalent to a set of linear equations with constant coefficients, as shown in FIG. 3.

The second step is the synchronous transformation from stationary d-q variables to rotating d-q variables. This transformation involves the angle Θ between the two systems and is described by the matrices given in the figure. The rotation transformation is often referred to as a "vector rotation" since the d-q quantities can be combined as a vector and the transformation then amounts to the rotation of one vector with respect to the other. FIG. 3 includes the vector rotation equations.

FIG. 4 depicts the inverse synchronous transformations to those performed in FIG. 3. Initially, a rotating-to-stationary synchronous transformation is made using the matrices depicted in FIG. 4. After the stationary rotor reference frame variables are established, a two phase to three phase synchronous transformation is made, consistent with the equations provided in the figure.

FIG. 5 shows a control scheme specifically directed to the series active filter of FIG. 1. The three-phase source currents, $i_{sa}$, $i_{sb}$, $i_{sc}$ are measured and transformed from three-phase to two-phase stationary reference frame ds–qs quantities using a 3-to-2 phase transformer 50A. The 3-to-2 phase transformer executes the following equation:

$$\begin{bmatrix} i^s_{sqs} \\ i^s_{sds} \end{bmatrix} = \sqrt{2/3} \begin{bmatrix} 1 & -1/2 & -1/2 \\ 0 & -\sqrt{3}/2 & \sqrt{3}/2 \end{bmatrix} \begin{bmatrix} i_{sa} \\ i_{sb} \\ i_{sc} \end{bmatrix}$$

The stationary reference frame ds–qs source currents from the 3-to-2 phase transformer 50A are then transformed to a synchronous rotating de–qe reference frame by a stationary-to-rotating transformer 52A which executes the following equation:

$$\begin{bmatrix} i^e_{sqs} \\ i^e_{sds} \end{bmatrix} = \begin{bmatrix} \cos\theta & -\sin\theta \\ \sin\theta & \cos\theta \end{bmatrix} \begin{bmatrix} I^s_{qs} \\ I^s_{ds} \end{bmatrix}$$

The unit vectors cos Θ and sin Θ are obtained from a phase-locked loop 54 which is illustrated in FIG. 6. The phase-locked loop 54 obtains an instantaneous vector sum of the three-phase input voltages ($V_{ia}$, $V_{ib}$, $V_{ic}$) by using a 3-to-2 phase transformer 50B that generates signals $v_{di}$ and $v_{qi}$. These signals are conveyed to a phase detector 56. The phase detector output may be defined as:

sin (phase error)=vdi * cos Θ–vqi * sin Θ

In the equation, sin Θ and cos Θ are the values presently pointed to in a look-up table 58.

The phase detector 56 output is processed by a proportional plus integral (PI) controller 60 which provides fast response and zero steady-state tracking error. The PI controller 60 output is used to determine the count parameter of a timer or digital oscillator 62. The timer count value is decremented from the count parameter value at a constant rate, when zero is reached the sin Θ and cos Θ pointers in the look-up table 58 are incremented. Since this is a closed-loop system, the timer count value is either increased or decreased, depending on the PI controller 60 output, so as to reduce the phase error until a phase-locked condition is achieved. Naturally, a hardware implementation of the phase-locked loop may also be used.

Returning to FIG. 5, in the synchronously rotating de–qe reference frame at synchronous frequency Θ, the components of signals $I^e_{sqs}$ and $I^e_{sds}$ at the fundamental frequency Θ, are transformed to dc quantities and all the harmonics are transformed to non-dc quantities and undergo a frequency shift in the spectrum. Low-pass filters 70 are used to yield dc signals, $I^e_{sqsdc}$ and $I^e_{sdsdc}$, in the synchronous reference frame. The dc signals correspond to the fundamental component of the source current. A rotating-to-stationary transformer 72A is used to transform the signals from the synchronous reference frame to a stationary reference frame. In particular, the rotating-to-stationary transformer 72A executes the following equation:

$$\begin{bmatrix} i^s_{sqs_f} \\ i^s_{sds_f} \end{bmatrix} = \begin{bmatrix} \cos\theta & \sin\theta \\ -\sin\theta & \cos\theta \end{bmatrix} \begin{bmatrix} I^e_{sqs_{dc}} \\ I^e_{sds_{dc}} \end{bmatrix}$$

The stationary reference frame output signals $I^s_{sqs_f}$ and $I^s_{sds_f}$ are transformed to a three-phase signal with a 2-to-3 phase transformer 74A that executes the following equation:

$$\begin{bmatrix} i_{sa}^* \\ i_{sb}^* \\ i_{sc}^* \end{bmatrix} = \sqrt{2/3} \begin{bmatrix} 1 & 0 \\ -1/2 & -\sqrt{3}/2 \\ -1/2 & \sqrt{3}/2 \end{bmatrix} \begin{bmatrix} i_{qs_f}^s \\ i_{ds_f}^s \end{bmatrix} \quad 5$$

The 2-to-3 phase transformer 74A yields three-phase reference source currents $i^*_{sa}$, $i^*_{sb}$, and $i^*_{sc}$. The reference currents are then applied to the series filter 34 by means of an appropriate modulator as known by those skilled in the art. The series active filter is in series with the supply, the current reference signals are derived from the supply currents.

Since any non-dc components in the synchronous reference frame are attributed to harmonics in the three-phase reference frame, low-pass filtering of the synchronous reference frame signal yields the fundamental source current in the three-phase reference frame.

While this approach seems highly desirable, there are still a number of problems associated with it. First, the passive filter provides additional fundamental reactive power which can be highly undesirable for high displacement factor loads, such as Adjustable Speed Drives (ASDs) with diode or thyristor input side converters and cycloconverters. Next, this may result in a leading power factor. Another problem is that there is a potential for instability for some loads, such as, ASDs with diode or thyristor input side converters with high pass input filter capacitors. Another problem is that it is not a cost effective solution as it increases the cost of the overall passive filter system. In lower-power, cost-sensitive applications, it is important to keep the design of the passive filter as simple as possible. Tuned LC passive filters are custom components that can be expensive. Tuned LC passive filters must be sharply tuned to obtain characteristics similar to a notch filter. This requirement results in large passive filter rating and size.

Another problem with passive filters relates to distortion. As the line current is sinusoidal, all harmonic currents are forced into the passive filter, causing possibly unacceptable voltage distortion components at those frequencies where the passive filter does not have a very low impedance. Further, the passive filter has to be designed to handle the entire harmonic content of the non-linear load. This increases the kVA rating of the passive filter.

Another problem associated with the system of FIG. 1 is that the higher harmonic (>=11th) load currents may result in appreciable voltage Total Harmonic Distortion (THD) at the passive filter terminals, due to the finite impedance of the shunt passive filter system at higher harmonic frequencies. That is, voltage distortion at the passive filter is equivalent to the product of the impedance at a given frequency and the existing harmonic currents. Since the passive filter is largely directed to absorbing 5th and 7th harmonics, appreciable impedance exists for higher harmonics. As a result, the presence of any higher order harmonics at the passive filter produces significant voltage distortion.

In the presence of voltage distortion at the passive filter, the load is supplied by a non-sinusoidal voltage. Due to the nonlinear nature of the load, the non-sinusoidal voltage may result in an increase or decrease of the original load harmonic current amplitudes and may also result in generation of new load harmonics. Further, the non-sinusoidal terminal voltage may be highly objectionable for voltage harmonic sensitive loads. In view of these problems, it would be highly desirable to provide a technique for reducing passive filter terminal voltage distortion.

OBJECTS AND SUMMARY OF THE INVENTION

It is a general object of the present invention to provide a hybrid active-passive power line conditioner with the capability of providing controlled harmonic injection into the supply.

It is a related object of the invention to provide a hybrid active-passive power line conditioner which reduces distortion at the passive filter by injecting a predetermined percentage of harmonics into the power supply.

It is another object of the invention to provide a hybrid active-passive power line conditioner wherein the passive filter system has reduced size and rating.

It is another object of the invention to provide a hybrid series active and parallel passive power line conditioner that utilizes a simplified passive filter system, such as a power factor correction capacitor.

It is still another object of the invention to provide a hybrid active-passive power line conditioner which is insensitive to the absence of particular load current harmonics and thereby is not be dependent on the characteristics of the load.

These and other objects are achieved by a power line conditioner in accordance with the invention. The power line conditioner includes an active filter coupled, in series, and a passive filter coupled, in parallel, to a three-phase power distribution network. The three-phase power distribution network includes a voltage source that induces three-phase input currents at a first end of the three-phase power distribution network. A load, circulating three-phase load currents, is positioned at a second end of the three-phase power distribution network. The active filter controller of the invention uses synchronous transformations to identify selected harmonic reference components corresponding to individual harmonics of the three-phase load currents. The selected harmonic reference components are multiplied by a predetermined factor corresponding to a permissible percentage of the individual harmonics that may be injected into the supply voltage. This results in active filter reference signal components that are applied to the active filter. In response to the active filter reference signal components, the active filter injects a permissible percentage of harmonics into the supply voltage so as to reduce the voltage distortion at the passive filter. By reducing voltage distortion, the controlled injection of harmonics into the supply allows for a simplified passive filter design. Consequently, the passive filter may be implemented as a power factor correction capacitor.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
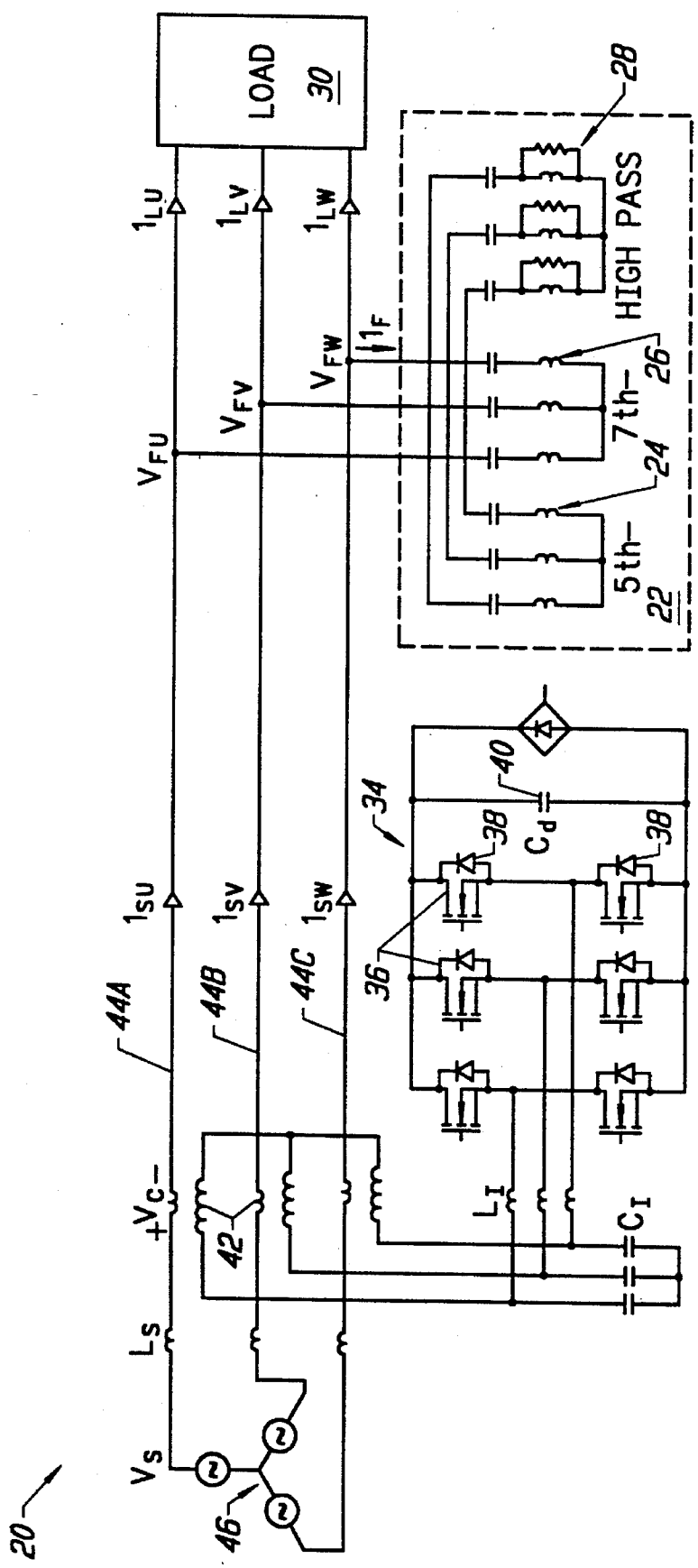
FIG. 1 depicts a hybrid series active-parallel passive power line conditioner in accordance with the prior art.
Figure 2A:
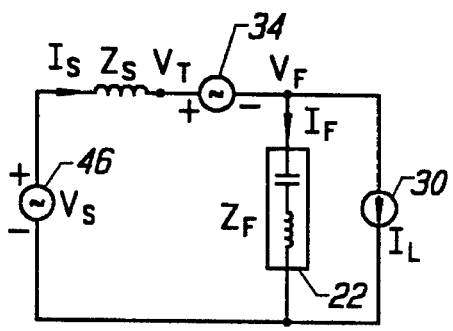
FIGS. 2(a) through 2(c) depict electrically equivalent circuits corresponding to the system of FIG. 1.
Figure 2B:
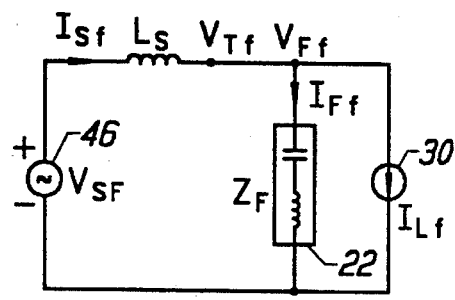
Figure 2C:
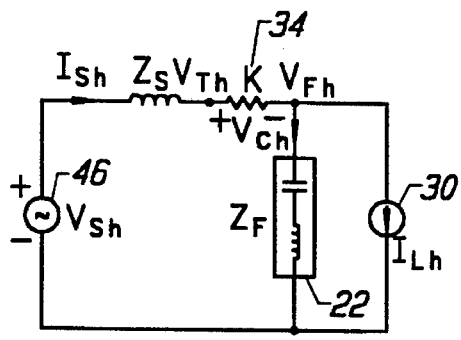
Figure 3:
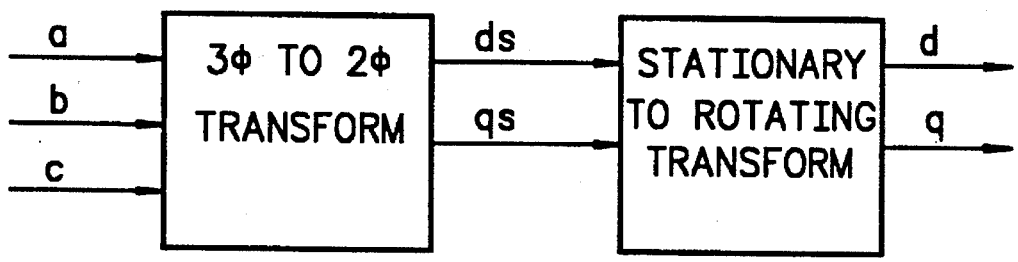
FIG. 3 depicts a field orientation control system and its corresponding mathematical model.
Figure 4:
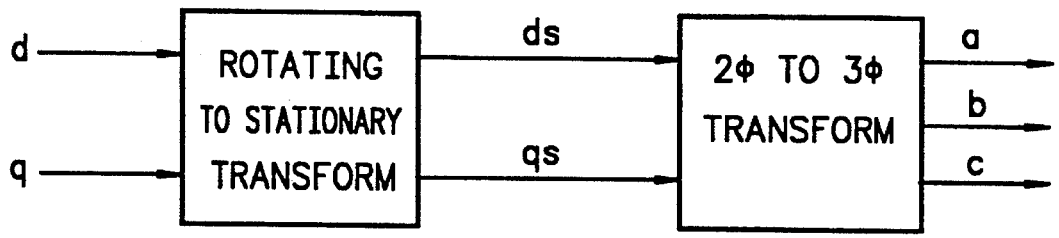
FIG. 4 represents a field orientation control system and its corresponding mathematical model.
Figure 6:
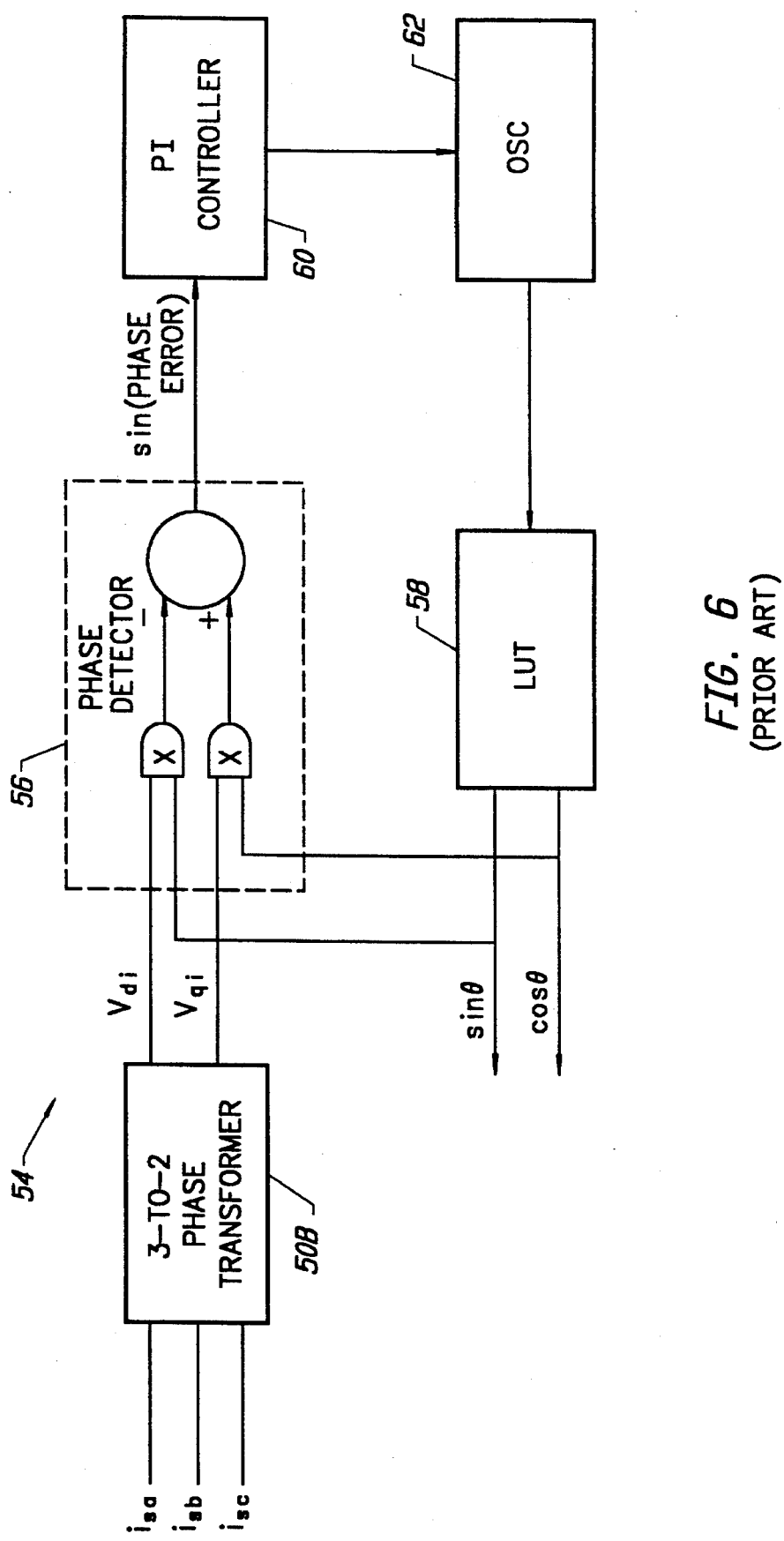
FIG. 6 depicts a phase-locked loop which may be used in conjunction with the field orientation control system of FIG. 5.
Figure 7:
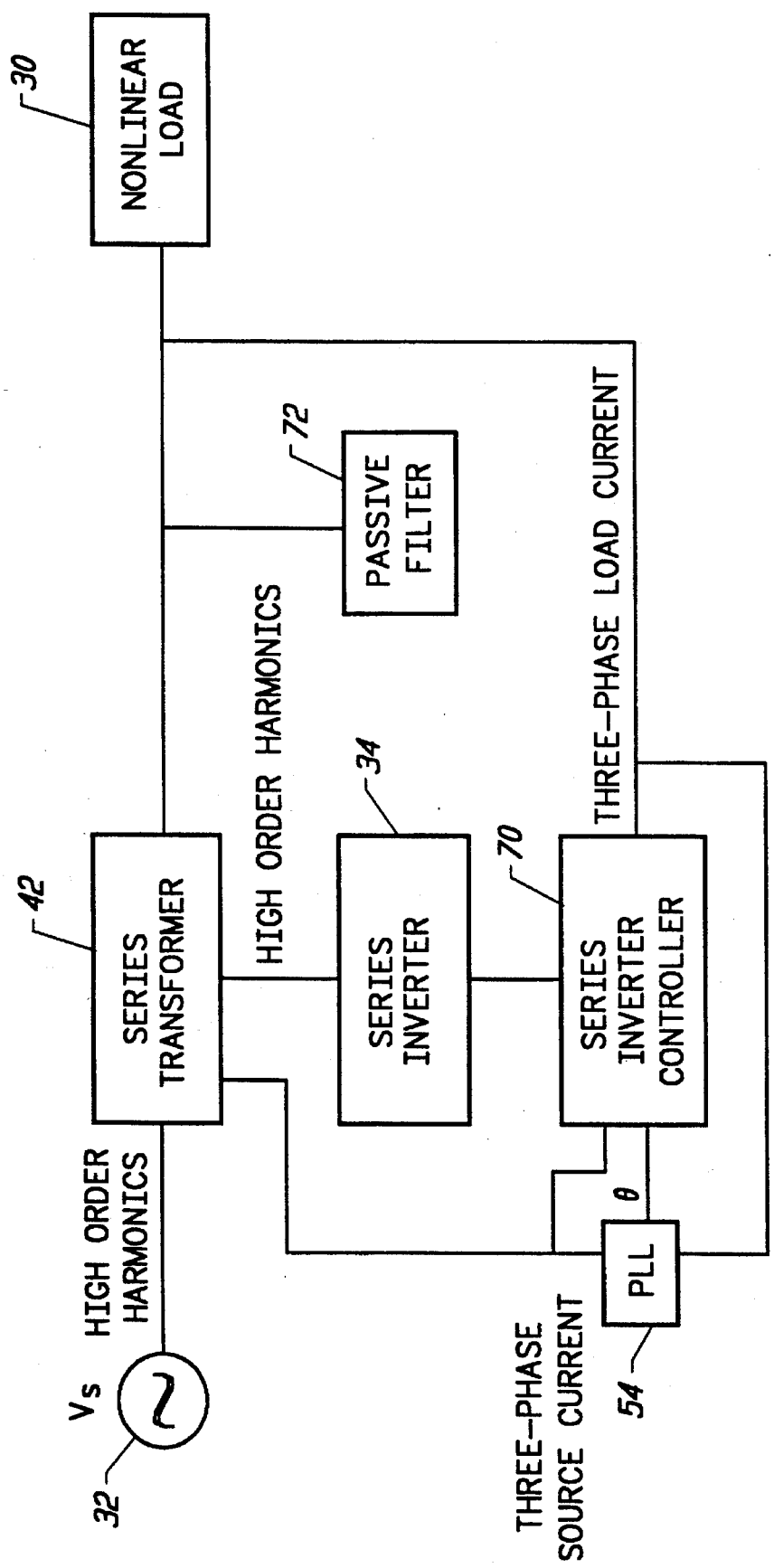
FIG. 7 depicts the hybrid active-passive power line conditioner of the present invention.

FIG. 7 depicts elements associated with the present invention. In general, the invention is directed to a series inverter controller 70 that is used in conjunction with other known elements. FIG. 7 illustrates that the series inverter controller 70 of the invention is used to control a series inverter 34 (such as a resonant dc link inverter) which is coupled to a series transformer 42 positioned between a voltage supply 32 and a nonlinear load 30. A phase-locked loop 54 is coupled to the series inverter controller 70 and a passive filter 72 is provided. The series transformer 42, series inverter 34, and passive filter 72 may be of the type disclosed in relation to FIG. 1. The phase-locked loop 54 may be of the type described in relation to FIG. 6.

Figure 5:
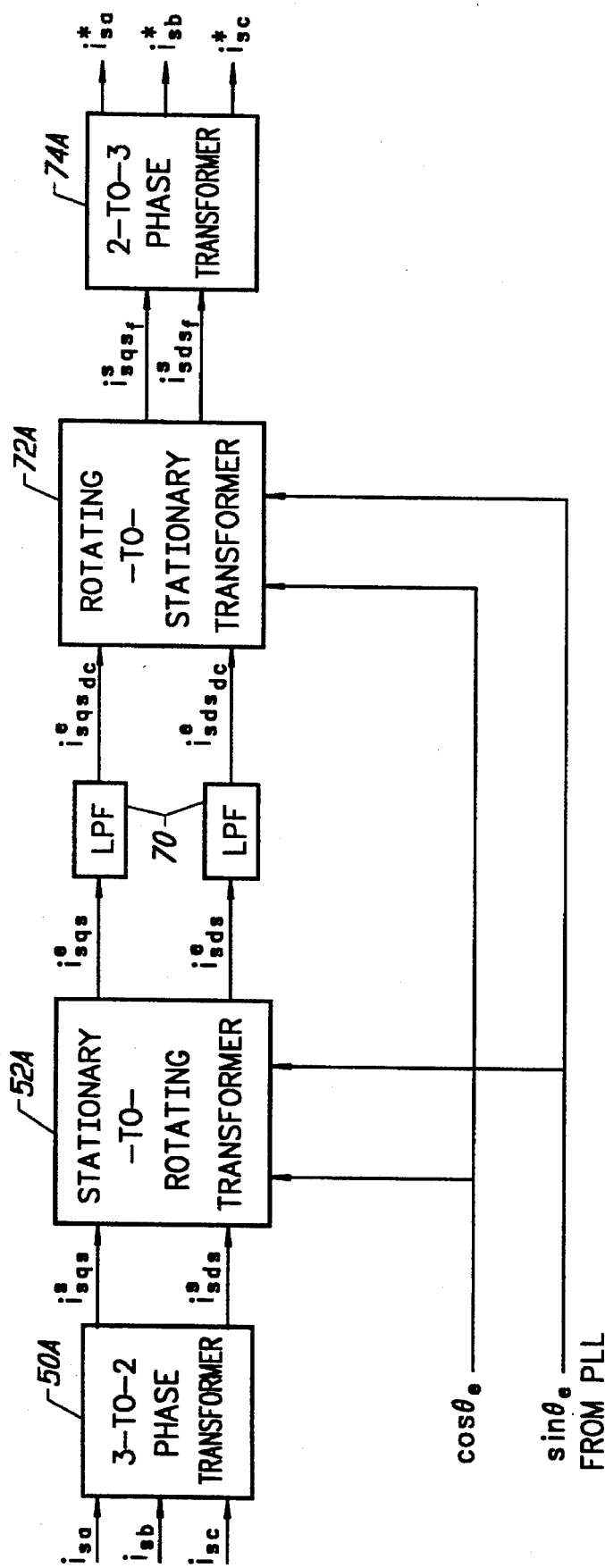
FIG. 5 illustrates a field orientation control system which may be employed in conjunction with the system of FIG. 1.

The series inverter controller 70 of the invention departs from prior art controllers, such as the one described in FIG. 5, in that it is designed to inject a controlled amount of high order harmonics into the voltage supply 32. Note that prior art series inverter controllers function to eliminate harmonics by generating signals to cancel existing harmonics. The present invention does not eliminate harmonics as in the prior art, rather it injects a permissible amount of harmonics, as stipulated by IEEE 519 harmonic current standards, into the power distribution system.

By injecting a controlled amount of high order harmonics into the voltage supply 32, the total amount of load current harmonics into the passive filter 72 is reduced, thereby reducing the voltage distortion at the load bus/terminal 30. As a result of this control strategy, the design of the passive filter 72 may be simplified. Specifically, in accordance with the invention, the passive filter 72 may be in the form of a power factor correction capacitor. In the alternative, the passive filter 72 may be in the form of a tuned LC filter with or without a high pass branch.

Figure 8:
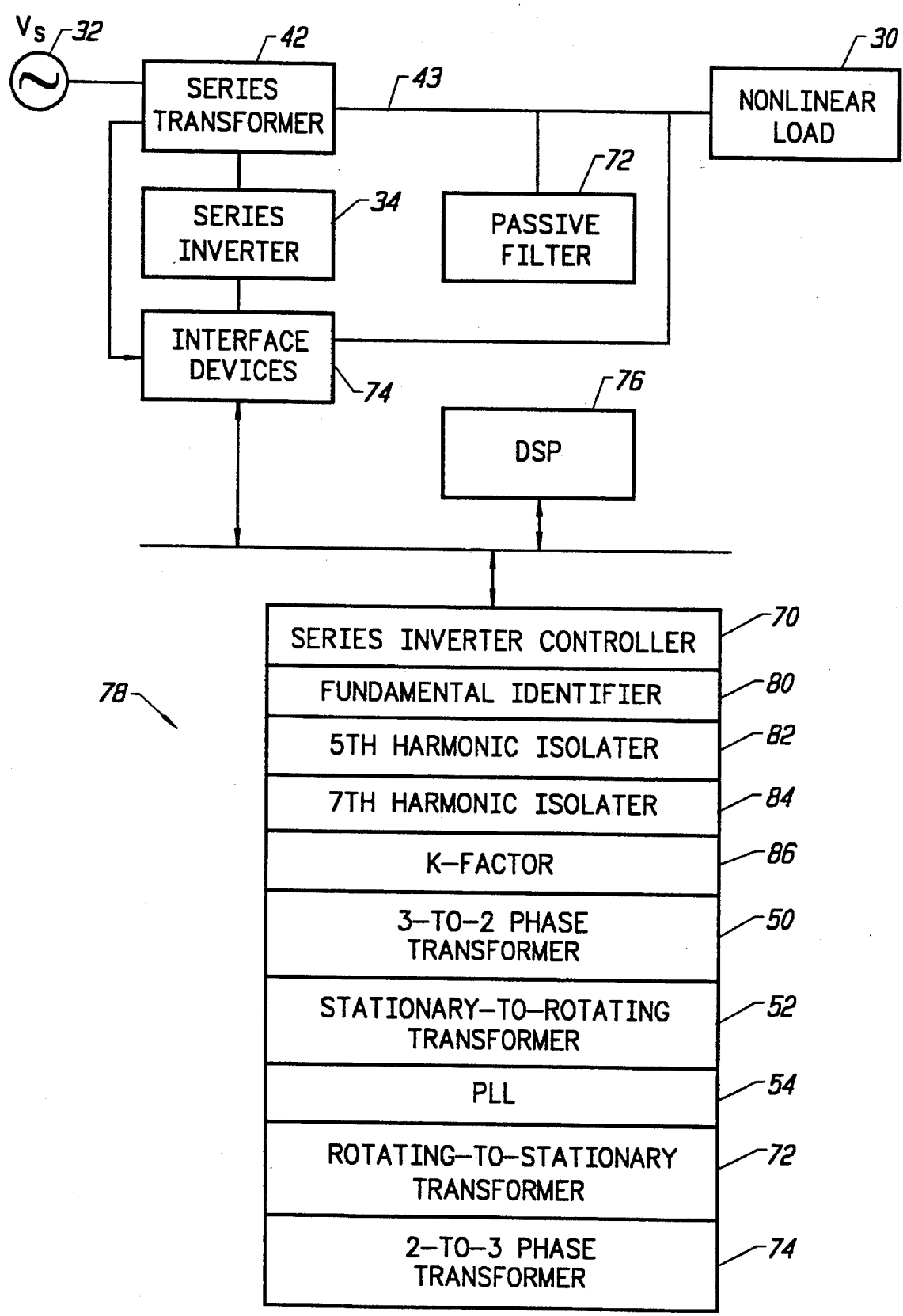
FIG. 8 depicts the analog and digital components associated with a preferred embodiment of the present invention.

The invention is more fully described in relation to FIG. 8. FIG. 8 is a block diagram generally corresponding to FIG. 7, but separately depicting the hardware and computer controlled elements of the invention. In one embodiment of the invention, a digital signal processor 76 is used in conjunction with a memory unit 78 to execute a number of control programs. The memory unit 78 may be RAM, ROM, disc storage, or any suitable combination of memory elements. The apparatus also includes interface devices 74 for providing analog/digital and digital/analog conversions between the digital signal processor 76 and the remaining analog elements. The interactions between a digital signal processor 76, a memory unit 78, and interface devices 74 is known in the art.

The control programs stored in memory 78 include the series inverter controller 70, which specifically includes a fundamental identifier 80, a 5th load current harmonic isolater 82, a 7th load current harmonic isolater 84, and a stored K-factor 86. The memory 78 will also store short-circuit ratio information, IEEE 519 permissible harmonic current limits and related information that will be discussed below. The control programs also include a 3-to-2 phase transformer 50, a stationary-to-rotating transformer 52, a phase-locked loop 54, a rotating-to-stationary transformer 72, and a 2-to-3 phase transformer 74, all of the type previously described.

The series inverter controller 70 generates a set of signals, which are applied through interface devices 74, that force the series inverter 34 to generate a controlled amount of high order voltage harmonics. The controlled amount of high order voltage harmonics are conveyed through series transformer 42 to the voltage supply 32. In accordance with the invention, the controlled amount of high order load current harmonics injected into the voltage supply are within IEEE standards. By injecting high order harmonics into the voltage supply 32, the voltage distortion otherwise caused by high order load current harmonics at the passive filter 72 is substantially reduced.

The series active filter inverter 34 regulates the supply current by injecting harmonic voltages across the series coupled transformer 42. The supply current is regulated to force a predetermined percentage of load current harmonics into the supply 46.

Figure 9:
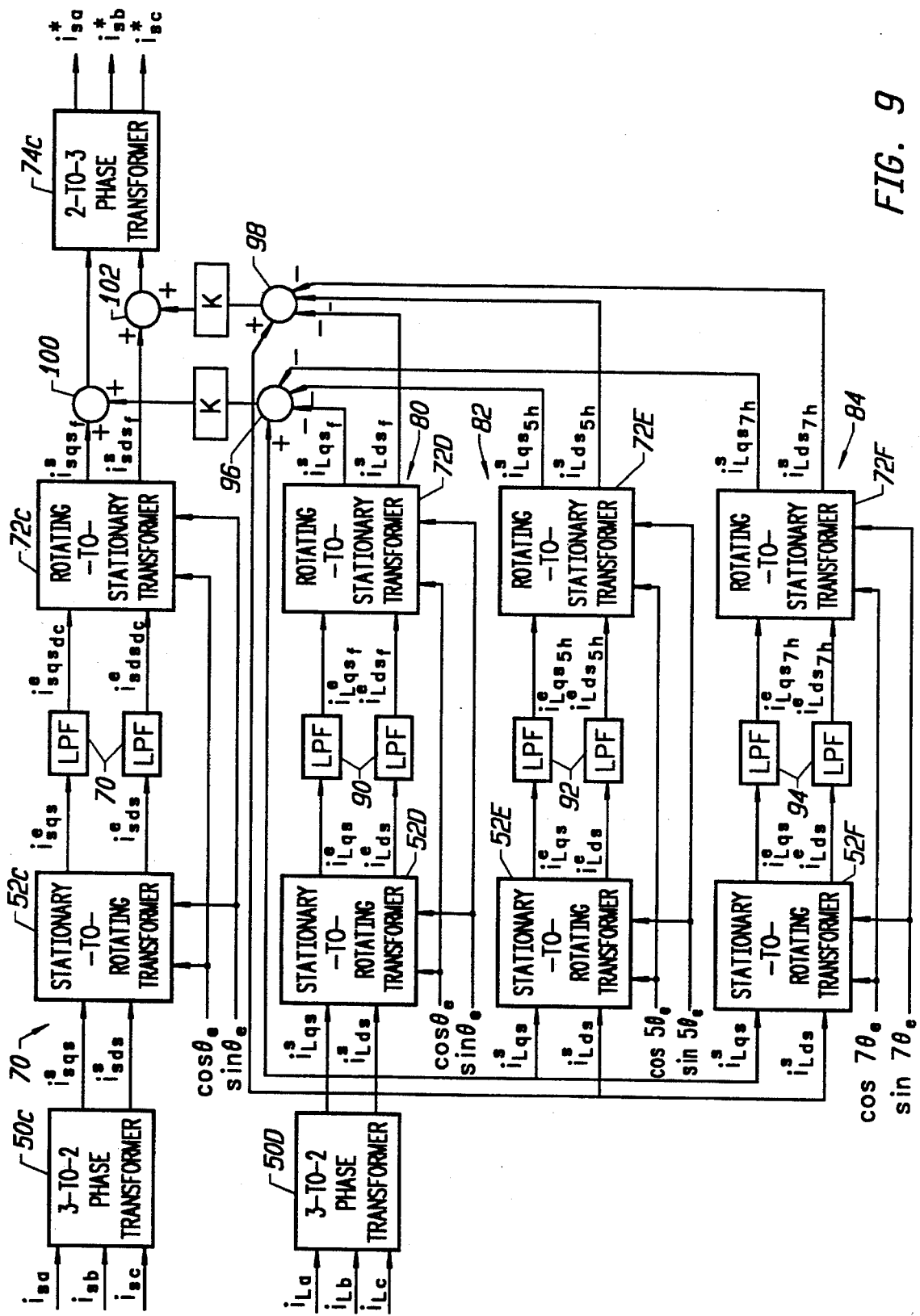
FIG. 9 is a detailed representation of the active filter controller associated with the power line conditioner of the present invention.

FIG. 9 is a detailed representation of the series inverter controller 70 of the invention. By way of overview, the series inverter controller 70 utilizes synchronous transformations upon a set of supply and load current input signals to generate series inverter current reference signals that will force the series inverter 34 to inject high order load current harmonics into the voltage supply 32. More particularly, synchronous transformations are utilized to identify load current fundamental signals, load current 5th harmonic signal components, and load current 7th harmonic signal components. These signals are then subtracted from the total load current signal. After subtraction of the load current fundamental signals, the load current 5th harmonic signal components, and the load current 7th harmonic signal components from the load current, the only load current signal components remaining are the high harmonic load current signal components corresponding to the 11th and greater harmonic components in the load current signal.

Injection of all the high harmonic load current signal components into the supply may violate IEEE requirements. Thus, in accordance with the invention, a "k-factor" is defined to establish a permissible percentage of the total high harmonic load current signal components that may be injected into the voltage supply. The product of the "k-factor" and the high harmonic load current signal components is added to the two-phase stationary reference frame supply current fundamental which results in a two-phase series current reference signal that is converted to a three-phase series current reference signal that is applied to the series inverter 34.

Having provided an overview of the processing associated with the series inverter controller 70 of the invention, attention presently turns to a more detailed consideration of the operation of the controller 70. Elements 50C, 52C, 70, 72C, and 74C of the controller 70 operate in accordance with the controller described in relation to FIG. 5. In accordance with the invention, the series inverter current reference signals are further processed to result in the injection of a controlled percentage of load current harmonics into the voltage supply. This series inverter current reference signal processing is accomplished by processing the three-phase supply and load current signals. In order to insure balance between the load currents and series input currents, one phase may be derived from the other two phases. For instance, the following equation may be used $I_{lb}=-(I_{la}+I_{lc})$.

A 3-to-2 phase transformer 50D is then used to yield two-phase stationary reference frame ds–qs quantities. Stationary-to-rotating transformers (52D, 52E, 52F) are used to produce corresponding two-phase rotating reference frame ds–qs quantities. Stationary-to-rotating transformer 52D receives phase values from the phase-locked loop 54 that correspond to the fundamental component of the load current (n=1, $\Theta$), therefore it yields a dc component corresponding to the fundamental component of the load current. Low-pass filters 90 are used to extract the dc component and filter all high frequency components corresponding to harmonics in the load current signal. A suitable second order Butterworth low-pass filter transfer function is as follows:

$$G(s) = \frac{1}{[s^2/W_c^2 + S/QW_c + 1]}$$

where Q is the Q-factor of the low-pass filter. A Butterworth filter is preferable because it provides a maximally flat low pass response. Since the fundamental component in the synchronous reference frame is a dc signal, recovery of this signal requires a maximally flat low-pass filter response.

Stationary-to-rotating transformer 52E receives phase values from the phase-locked loop 54 that correspond to the 5th harmonic of the load current (n=5, 5$\Theta$), therefore it yields a dc component corresponding to the 5th harmonic of the load current. Second order low-pass filters 92 with a cut-off frequency of 10 Hz are used to extract the dc signals corresponding to the 5th harmonic. The transfer function defined above may be used for the filter.

Stationary-to-rotating transformer 52F receives phase values from the phase-locked loop 54 that correspond to the 7th harmonic of the load current (n=7, 7$\Theta$), therefore it yields a dc component corresponding to the 7th harmonic of the load current. Second order low-pass filters 94 with a cut-off frequency of 30 Hz are used to extract the dc signal corresponding to the 7th harmonic. The transfer function defined above may be used for the filter.

Rotating-to-stationary transformers (72D, 72E, 72F) are used to transform the dc signals from the low pass filters to two-phase stationary reference frame ds–qs quantities. In particular, rotating-to-stationary transformer 72D generates two-phase fundamental current reference signals $I^s_{lqsf}$ and $I^s_{ldsf}$, corresponding to the fundamental component of the load current. Rotating-to-stationary transformer 72E generates two-phase fundamental current reference signals, $I^s_{lqs5h}$ and $I^s_{lds5h}$, corresponding to the 5th harmonic component of the load current. Rotating-to-stationary transformer 72F generates two-phase fundamental current reference signals, $I^s_{lqs7h}$ and $I^s_{lds7h}$, corresponding to the 7th harmonic component of the load current.

Mixer 96 is used to respectively subtract the "q" components of the fundamental load current signal, the 5th harmonic load current signal, and the 7th harmonic load current signal from the original "q" component of the load current. This operation results in a "q" component load current series reference signal corresponding to the high order harmonics of the load current signal.

Similarly, mixer 98 is used to respectively subtract the "d" components of the fundamental load current signal, the 5th harmonic load current signal, and the 7th harmonic load current signal from the original "d" component of the load current. This operation results in a "d" component load current series reference signal corresponding to the high order harmonics of the load current signal.

As previously indicated, injecting the entire high order harmonic content of the load current into the supply would exceed IEEE guidelines describing harmonic injection limitations. Thus, in accordance with the invention, a "k-factor" is defined to establish a harmonic injection percentage that complies with IEEE guidelines. In other words, the amount of high-order harmonics injected into the supply is limited by the "k-factor", which is defined as a value between 0 and 1. Determination of an appropriate "k-factor" is described below.

After the "q" component load current series reference signal and the "d" component load current series reference signal are modified by an appropriate "k-factor", the signals are respectively added at mixers 100 and 102 to a "q" component input series current reference signal $i^s_{sqsf}$ and a "d" component input current series reference signal $i^s_{sdsf}$. These operations result in two-phase series inverter current reference signals that are transformed by 2-to-3 phase transformer to three-phase series inverter current reference signals $i^*_{sa}$, $i^*_{sb}$, $i^*_{sc}$.

The three-phase series inverter current reference signals are converted by interface devices 74 into appropriate drive signals to be executed by the series inverter 34. The output of the series inverter 34 is relayed to the series transformer 42, which allows the high order load current harmonics to enter the voltage supply 32 from the load side. Since the voltage supply 32 receives the high order load current harmonics instead of the passive filter, the voltage distortion at the passive filter terminal is reduced. The 5th and 7th load harmonic currents flow into the parallel passive filter system since the passive filter is tuned at 5th and 7th harmonic frequencies. In addition, the percentage of high order load current harmonics that is not injected into the supply flows into the passive filter system.

The reduced voltage distortion at the passive filter allows for a number of novel passive filters. A known passive filter tuned to the 5th and 7th harmonics, with or without a high-pass branch, may be used. With the controller of the invention, the passive filter need not be precisely tuned. This fact allows for the component tolerances of the passive filter system to be reduced.

In a preferred embodiment of the invention, the passive filter is implemented in the form of a power factor correction capacitor. The simplified passive filter structure is enabled by the described injection of controlled amounts of load current harmonics into the voltage supply.

Having fully disclosed the invention, attention presently turns to some implementation details associated with specific embodiments of the invention. The subsequent discussion will also identify some of the benefits associated with the invention.

The maximum allowable supply harmonic current THD and the maximum individual harmonic currents, as specified by the IEEE 519 harmonic current standard, depends on the Short Circuit Ratio (SCR) of the supply system. The SCR of the supply system denotes if the supply system is a "strong"

or "weak" system. The reciprocal of the supply line impedance $X_s$ is equal to the SCR of the system. A higher SCR for the supply system denotes lower line impedance and a "strong" supply system, while a lower SCR of the supply system denotes higher line impedance and a "weak" supply system. Thus, the SCR of the supply system helps determine the maximum allowable total harmonic current and the maximum allowable individual harmonic current injection into the supply. Table I defines proposed harmonic current limits for a range of SCRs.

TABLE I

Proposed Percentage of Harmonic Current Limits for IEEE 519

| | (Individual Frequency Limits) | | | | |
|---|---|---|---|---|---|
| SCR | h < 11 | 11–17 | 18–23 | 24–35 | h > 35 |
| <19 | 4.0% | 2.0% | 1.5% | 0.6% | 0.3% |
| 20–49 | 7.0% | 3.5% | 2.5% | 1.0% | 0.5% |
| 50–99 | 10.0% | 4.5% | 4.0% | 1.5% | 0.7% |
| 100–999 | 12.0% | 5.5% | 5.0% | 2.0% | 1.0% |
| >1000 | 15.0% | 7.0% | 6.0% | 2.5% | 1.4% |

Thus, it can be appreciated that a "k-factor" may be selected on the basis of the short circuit ratio of the supply system. The 5th and 7th load current harmonics may be filtered by the passive filter 72. Thus, the harmonic limits of interest in selecting a "k-factor" are the 11th harmonic and above. By way of example, if the SCR of the supply system is 30, then the maximum permissible harmonic current in the supply for current harmonics greater than 35 is 0.5% of the fundamental supply current rms value. Note that the fundamental supply current is being extracted by the controller as depicted in FIG. 9. Consequently, a computation of the fundamental supply current rms value can be readily obtained.

The "k-factor" may be a uniform value applied to all high order load current harmonics, as depicted in FIG. 9. In this case, the "k-factor" must be within the percentage values established for the highest harmonic (in Table I, h>35).

A simple way to determine the uniform k-factor applied to all high order load current harmonics is to incrementally increase the k-factor from zero to 1. The supply current THD is then calculated for each incremental value. The SCR of the supply system determines the maximum permissible supply current THD as given in Table I. The k-factor may then be selected so that the supply current THD is in compliance with the IEEE 519 harmonic current standards.

On the other hand, one skilled in the art may apply the teachings of the invention to apply specific "k-factors" to individual load current harmonics which are identified through synchronous transformations of the type described in relation to FIG. 9.

Determination of the k-factor for individual load current harmonics is based on the maximum permissible individual harmonic limit for a given SCR of the supply system, as stipulated in IEEE 519 harmonic current standards. The rms value of the fundamental supply current and the rms value of the individual load harmonic currents can be computed through standard techniques. This establishes the k-factor for each of the load current harmonics.

It will be appreciated from table I that the lower the current harmonic, the higher the maximum permissible limit that can be injected into the supply. Thus, it is advantageous to inject a higher percentage of lower order load current harmonics into the supply. The controller of the invention will achieve greater reduction of the passive filter terminal voltage THD if the SCR of the system is high.

Through the selection of a "k-factor", the controller of the invention can be used to match the IEEE 519 supply current THD and passive filter terminal voltage THD limits, or the "k-factor" may be selected to be well within the stipulated limits. Thus, the controller of the invention is a flexible device allowing a variety injection levels.

One skilled in the art will recognize that the controlled percentage of the higher harmonic load currents to be injected into the supply can also be determined from the maximum permissible voltage THD and individual harmonic voltages. IEEE 519 voltage THD standards stipulate a maximum permissible voltage THD of 5% and individual voltage harmonics to be no more than 3% for a 480 V supply.

As previously indicated, the passive filter 72 may be implemented in the form of a power factor correction capacitor. The injection of a controlled percentage of higher harmonic load currents into the supply enables the use of a simpler passive filter structure such as a power factor correction capacitor. The filtering requirement and the size and rating of the power factor correction capacitor is determined by the fundamental reactive power demand of the load, percentage of total load harmonic currents into the capacitor and the specified load bus/terminal voltage THD limits based on IEEE 519 standards depending on the SCR of the system at the Point of Common Coupling.

Power factor correction capacitors act as high pass filters and hence are ideally suited for high displacement factor loads such as diode and thyristor converter loads, since their fundamental reactive power requirement is small, while the impedance offered at the dominant 5th, 7th, 11th and 13th harmonics is low, resulting in improved filtering characteristic.

Figure 10:
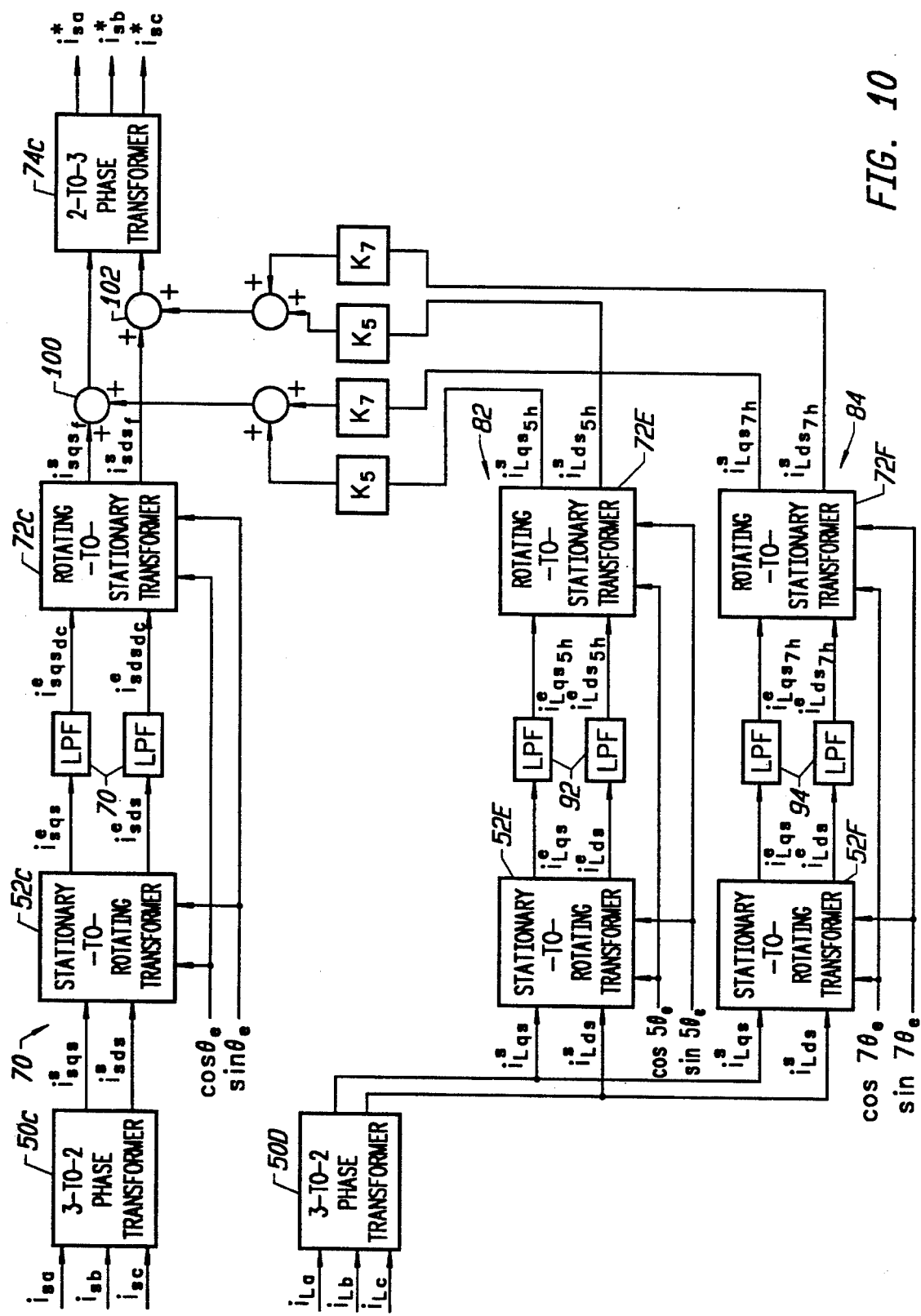
FIG. 10 is a detailed representation of an active filter controller adapted for use with a power factor correction capacitor.

FIG. 10 depicts a modified controller, in accordance with the invention, that may be used in conjunction with a power factor correction capacitor. Since the power factor correction capacitor will have a low impedance at high frequencies, in this embodiment of the invention, the high frequency load current harmonics are allowed to flow into the power factor correction capacitor. On the other hand, the low frequency load current harmonics (the 5th and 7th harmonics) will encounter a relatively large impedance at the power factor correction capacitor. To reduce the impedance created by this phenomenon, a controlled percentage of the low frequency load current harmonics are injected into the supply.

As demonstrated in FIG. 10, the 5th and 7th load current harmonics are identified and then multiplied by an appropriate k-factor. Preferably, the 5th harmonic will be multiplied by a k-factor that represents a larger percentage than the k-factor associated with the 7th harmonic. This is preferable because, as indicated above, under IEEE guidelines, a larger percentage of low order load current harmonics may be injected into the supply.

One skilled in the art will recognize that the power factor correction capacitor enabled by the controller of the invention does not require any tuning. Moreover, it allows a simple passive filter design.

The size and KVAR rating of the power factor correction capacitor is determined by the fundamental reactive power requirement of the load and the amount of load current harmonics forced into the capacitor. It also depends on the maximum permissible load bus/terminal voltage THD in a given application.

Figure 11A:
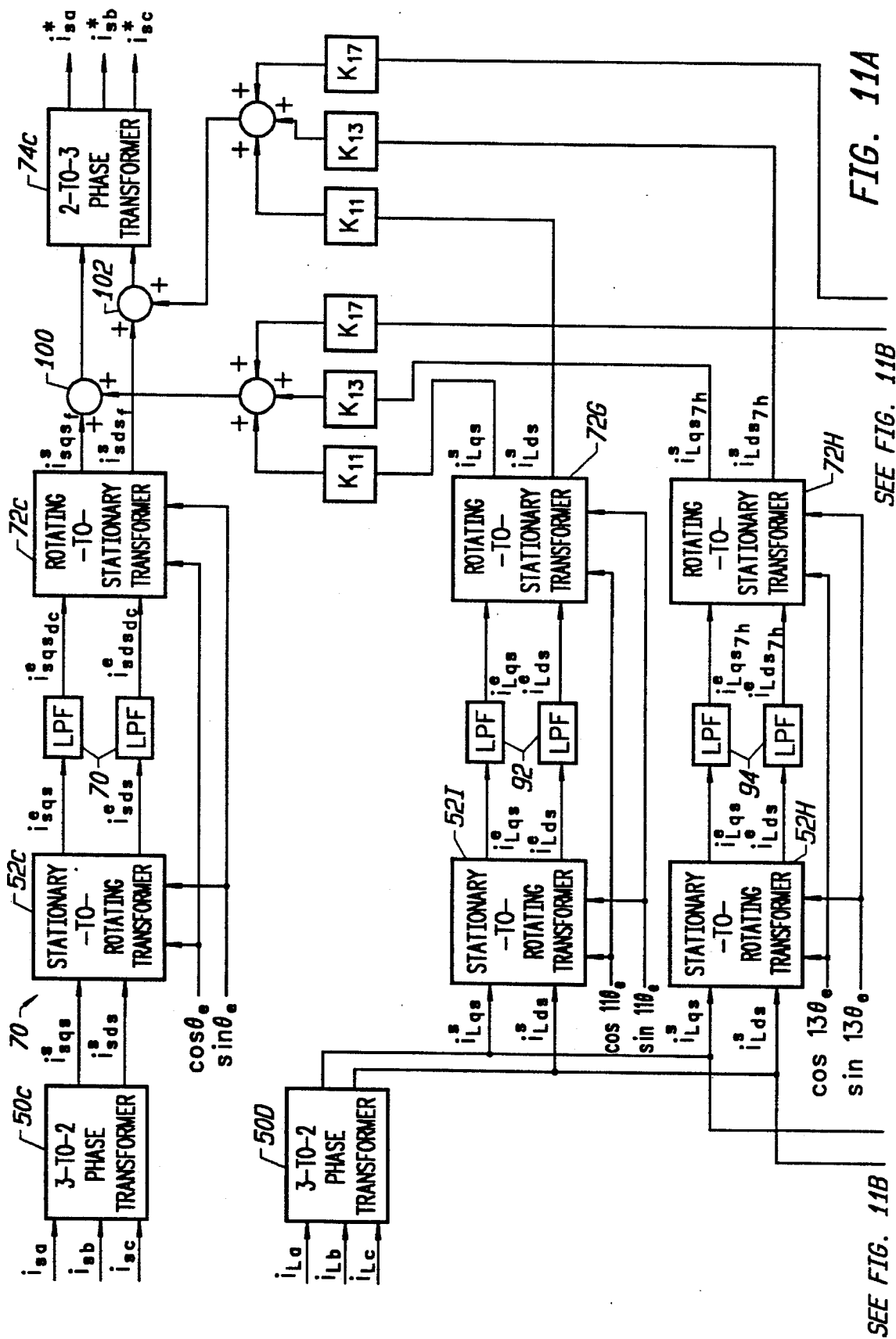
FIG. 11 is a detailed representation of an active filter controller adapted for use with an LC tuned filter that includes a high pass branch.

FIG. 11 depicts a controller, in accordance with the invention, that is optimized for a 5th and 7th harmonic LC tuned passive filter that includes a high pass branch. Such a filter has low impedance to the 5th, 7th, and high frequency harmonics (typically, harmonics greater than the 17th harmonic). Thus, to limit the voltage distortion created at the passive filter by the remaining load current harmonics, the controller may be modified to inject a controlled percentage of the remaining load current harmonics into the supply.

FIG. 11 depicts a controller that identifies the 11th, 13th, and 17th load current harmonics. The figure also depicts that each load current harmonic may be multiplied by a specific k-factor. Thus, the k-factor for the 11th harmonic will correspond to a larger permissible injection percentage than the k-factor for the 17th harmonic. Recall that the maximum percentage of allowable harmonics decreases with increasing harmonic numbers. Therefore, the maximum percentage of allowable harmonics in the 11th–17th range is higher than the allowable harmonics associated with the high order harmonics.

The controller of FIG. 11 is ideal for loads that generate lower order harmonics, such as Adjustable Speed Drive loads with diode bridge rectifier/converter inputs. The controller of FIG. 11 allows a passive filter with a small capacitor value high pass branch. Consequently, the high pass passive filter capacitor would have small size, rating and cost.

It will be appreciated that the controller of the invention may be used to inject any selected load current harmonic depending upon the characteristics of the load. It should be appreciated that the injection of lower order load current harmonics such as the 11th and 13th harmonics enables a higher amount of load harmonic current into the supply. This enables a larger reduction in the passive filter terminal voltage THD. This also results in reduction of the series active filter rating and also the parallel passive filter rating.

The issues concerning the optimization of the series active filter rating and of capacitive filtering requirements include: the fundamental reactive power demand of the load, the amount of load harmonic currents forced into the power factor correction capacitor, reduction of load bus/terminal voltage THD as a function of kVAR of capacitive filtering and load harmonic current injection in the line, and the increase/decrease in the fundamental reactive current in the supply due to the increased/decreased capacitive filtering and subsequent increase/decrease of the series active filter current rating respectively.

The selection of the lowest load current harmonic to be injected into the supply depends on the system considered in general and particularly on the following factors: the dominant load current harmonics, the size and kVAR rating of the power factor correction capacitor and the reduction in the load bus/terminal voltage THD achieved by the injection of load current harmonics into the supply, and the margin of load bus/terminal voltage THD compared to the IEEE 519 limits.

In lieu of synchronous transformations, instantaneous reactive power theory may be used to implement the controller of the invention. In the alternative, high-pass filters may be used to achieve the same result. The high-pass filter transfer function may be implemented by a summation of unity gain and Butterworth low-pass filter transfer functions.

Thus, it will be appreciated by those skilled in the art that a novel hybrid series active-parallel passive power line conditioner with controlled harmonic injection has been described. The system of the invention results in a number of important benefits. First, the invention enables the injection of controlled higher harmonic load currents into the supply and achieves reduction of the passive filter terminal voltage, regardless of the passive filter design. Further, the invention reduces the rating, size, and cost of the passive filter and the series active filter. As a result, utilization of the controller is not dependent on the design of the passive filter. This fact facilitates the significant benefit of a controller that can be applied to any passive filter structure and rating.

Another significant benefit associated with the invention is that it enables a reduction in the rating of the series inverter 34 by directly reducing the passive filter terminal voltage THD, while still complying with the IEEE 519 supply current THD and terminal voltage THD limits. This is a significant improvement in terms of the rating, size and cost of the series inverter 34 and enhances its economic viability.

Another benefit associated with the invention is that the use of a small rated series active filter system allows the use of a small rated dc link energy storage device. Hence, this fosters further reduction in system rating, size, and cost.

Finally, the invention is advantageous since it allows the use of a simplified passive filter system, such as a power factor correction capacitor.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, it should be appreciated that the controller of the invention may be a hardwired device, an ASIC, etc. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A power line conditioner, comprising:

an active filter, said active filter being coupled, in series through a series transformer, to a three-phase power distribution network, said three-phase power distribution network including a voltage source inducing three-phase input currents at a first end of said three-phase power distribution network, a load at a second end of said three-phase power distribution network, said load circulating three-phase load currents;

a passive filter coupled, in parallel, to said three-phase power distribution network; and an active filter controller coupled to said active filter, said active filter controller including means for generating control signals to force said active filter, with signals applied to said series transformer, to allow a predetermined amount of load harmonics into said voltage source, said load harmonics corresponding to selected harmonics of said three-phase load currents, and thereby reduce the voltage distortion at said passive filter.

2. The power line conditioner of claim 1 wherein said active filter controller includes means for identifying processed signals corresponding to the high order harmonic components of said three-phase load currents.

3. The power line conditioner of claim 2 wherein said active filter controller includes means for multiplying said processed signals by a predetermined factor to generate a series filter reference signal component corresponding to said load harmonics.

4. The power line conditioner of claim 2 wherein said identifying means includes means for isolating selected signals corresponding to the fundamental component, 5th harmonic component, and 7th harmonic component of said three-phase load currents.

5. The power line conditioner of claim 4 wherein said passive filter is implemented as a tuned LC filter.

6. The power line conditioner of claim 1 wherein said active filter controller includes means for identifying processed signals corresponding to the low order harmonic components of said three-phase load currents.

7. The power line conditioner of claim 6 wherein said active filter controller includes means for multiplying said processed signals by a predetermined factor to generate a series filter reference signal component corresponding to said load harmonics.

8. The power line conditioner of claim 6 wherein said identifying means includes means for isolating selected signals corresponding to the 5th harmonic component and 7th harmonic component of said three-phase load currents.

9. The power line conditioner of claim 8 wherein said passive filter is implemented as a power factor correction capacitor.

10. The power line conditioner of claim 1 wherein said active filter controller includes means for identifying processed signals corresponding to the mid-order harmonic components of said three-phase load currents.

11. The power line conditioner of claim 10 wherein said active filter controller includes means for multiplying said processed signals by a predetermined factor to generate a series filter reference signal component corresponding to said load harmonics.

12. The power line conditioner of claim 10 wherein said identifying means includes means for isolating selected signals corresponding to the 11th, 13th, and 17th harmonic components of said three-phase load currents.

13. The power line conditioner of claim 12 wherein said passive filter is implemented as a tuned LC filter with a high-pass branch.

14. The power line conditioner of claim 1 wherein said active filter controller utilizes synchronous transformations.

15. A method of operating a power line conditioner of the type including an active filter serially coupled, through a series transformer, to a three-phase power distribution network and a passive filter parallely coupled to said three-phase power distribution network, said three-phase power distribution network including a voltage source inducing three-phase input currents at a first end of said three-phase power distribution network and a load at a second end of said three-phase power distribution network, said load circulating three-phase load currents, said method comprising the steps of:

identifying, with an active filter controller, selected harmonic signals corresponding to specific harmonic signals of said three-phase load currents;

establishing, with said active filter controller, a controlled percentage of said selected harmonic signals; and forcing said active filter, with signals received from said active filter controller and applied to said series transformer, to allow said controlled percentage of said selected harmonic signals into said voltage source to reduce the voltage distortion at said passive filter.

16. The method of claim 15 wherein said identifying step includes the step of:

determining load fundamental reference signals corresponding to the load fundamental component of said three-phase load currents;

deriving 5th harmonic reference signals corresponding to the 5th harmonic component of said three-phase load currents;

calculating 7th harmonic reference signals corresponding to the 7th harmonic component of said three-phase load currents; and subtracting said load fundamental reference signals, said 5th harmonic reference signals, and said 7th harmonic reference signals from derived load current signals corresponding to said three-phase load current to yield said selected harmonic signals corresponding to the high order harmonic components of said three-phase load currents.

17. The method of claim 16 wherein said passive filter is implemented as a tuned LC filter.

18. The method of claim 15 wherein said identifying step includes the step of:

deriving 5th harmonic reference signals corresponding to the 5th harmonic component of said three-phase load currents;

calculating 7th harmonic reference signals corresponding to the 7th harmonic component of said three-phase load currents, said 5th harmonic reference signals and said 7th harmonic reference signals corresponding to said selected harmonic signals.

19. The method of claim 18 wherein said passive filter is implemented as a power factor correction capacitor.

20. The method of claim 15 wherein said identifying step includes the step of:

deriving 11th harmonic reference signals corresponding to the 11th harmonic component of said three-phase load currents;

calculating 13th harmonic reference signals corresponding to the 13th harmonic component of said three-phase load currents;

calculating the 17th harmonic reference signals corresponding to the 17th harmonic component of said three-phase load currents, said 11th harmonic reference signals, said 13th harmonic reference signals, and said 17th harmonic reference signals corresponding to said selected harmonic signals.

21. The method of claim 20 wherein said passive filter is implemented as a tuned LC filter with a high-pass branch.

* * * * *